US009582385B2

(12) United States Patent
Rozmovits et al.

(10) Patent No.: US 9,582,385 B2
(45) Date of Patent: Feb. 28, 2017

(54) SURVIVING WRITE ERRORS BY USING COPY-ON-WRITE TO ANOTHER SYSTEM

(71) Applicant: Dell Products L.P., Round Rock, TX (US)

(72) Inventors: Bernard Abraham Rozmovits, Milford, NH (US); Jeffrey R. Curless, Milford, NH (US); Damon Hsu-Hung, Providence, RI (US)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 13/742,875

(22) Filed: Jan. 16, 2013

(65) Prior Publication Data

US 2014/0201441 A1     Jul. 17, 2014

(51) Int. Cl.
*G06F 11/00*     (2006.01)
*G06F 11/20*     (2006.01)
*G06F 12/08*     (2016.01)

(52) U.S. Cl.
CPC ....... *G06F 11/2094* (2013.01); *G06F 12/0804* (2013.01); *G06F 12/0868* (2013.01); *G06F 2212/1032* (2013.01); *G06F 2212/281* (2013.01); *G06F 2212/313* (2013.01)

(58) Field of Classification Search
CPC ............. G06F 11/1402; G06F 11/1016; G06F 11/0727; G06F 11/1412; G06F 11/141

USPC ............................... 714/52, 42, 44, 6.13, 6.3
See application file for complete search history.

(56) References Cited

U.S. PATENT DOCUMENTS

| | | | |
|---|---|---|---|
| 7,325,107 B2 * | 1/2008 | Mather | 711/159 |
| 7,337,353 B2 * | 2/2008 | Yamamoto et al. | 714/47.2 |
| 8,386,834 B1 * | 2/2013 | Goel et al. | 714/6.1 |
| 2005/0114728 A1 * | 5/2005 | Aizawa et al. | 714/6 |
| 2005/0120267 A1 * | 6/2005 | Burton et al. | 714/13 |
| 2007/0106870 A1 * | 5/2007 | Bonwick et al. | 711/170 |
| 2010/0318721 A1 * | 12/2010 | Avila et al. | 711/103 |
| 2012/0117304 A1 * | 5/2012 | Worthington | G06F 12/0223 711/103 |
| 2014/0215129 A1 * | 7/2014 | Kuzmin et al. | 711/103 |

* cited by examiner

*Primary Examiner* — Philip Guyton
(74) *Attorney, Agent, or Firm* — Hamilton, Brook, Smith & Reynolds, P.C.

(57) ABSTRACT

In one embodiment, a method may include performing a copy-on-write in response to a write error from a first system, where the copy-on-write copies to a second system. The method may further include receiving a write request at the first system from a third system. The method may additionally include storing the data from the write request in a cache. The method may also include reporting successful execution of the write request. The method may further include writing data from the write request to a drive in the first system. The method may additionally include receiving the write error from the drive. In an additional embodiment, performing the copy-on-write may use the data stored in the cache.

15 Claims, 9 Drawing Sheets

SURVIVING WRITE ERRORS BY USING COPY-ON-WRITE TO ANOTHER SYSTEM

BACKGROUND OF THE INVENTION

Some storage and disk drive systems do not handle conditions where a drive is unable to fulfill a write request. Such conditions can be an indicator that the drive is unusable and should be removed. However, more reliable drive error reporting allows finer granularity in error handling.

SUMMARY OF THE INVENTION

Embodiments of the present invention address the foregoing. In embodiments, a method may include performing a copy-on-write in response to a write error from a first system, where the copy-on-write copies to a second system.

The method may further include receiving a write request at the first system from a third system. The method may additionally include storing the data from the write request in a cache. The method may also include reporting successful execution of the write request. The method may further include writing data from the write request to a drive in the first system. The method may additionally include receiving the write error from the drive. In an additional embodiment, performing the copy-on-write may use the data stored in the cache.

The second system may service data in a same way as the first system.

Performing the copy-on-write may include copying a containing data unit including the write error. In another embodiment, performing the copy-on-write may include copying a containing data unit including the location that caused the write error. The containing data unit may be data from a write request that generated the write error.

In one embodiment, a system includes a copy-on-write module configured to perform a copy-on-write in response to a write error from a first system. The copy-on-write may copy to a second system.

In yet another embodiment, a non-transitory computer readable medium may be configured to store instructions to be executed by a processor. The instructions may include performing a copy-on-write in response to a write error from a first system. The copy-on-write may copy to a second system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Embodiments of the present invention (storage system) comprise one or more separate systems (called nodes or members) which form a common pool of storage (called a group). User-visible volumes are serviced from the groups, such that individual chunks of a volume (called pages) may reside on any member in the group.

When a drive reports a write failure, and the system containing that drive belongs to a group with other nodes, the storage system can first move the entire containing page to a second node, and second, fulfill the write operation at the second node.

At least two types of write failures are potentially recoverable in the above described manner:

1. Although a drive can mask media issues by revectoring the failed write to a spare sector on the same drive, the write can still fail if the drive has no more spares.

2. A drive may enter read-only mode if its write head fails.

This method essentially performs a copy-on-write (COW) operation on the containing page. If, after a user takes a snapshot of a volume, the user modifies block L of page P in that volume and the data is written to block L of some other page P', then page P' is now what the user sees as the "real" or "current" version of the volume. If the user reads block L, the read is satisfied from page P'. If the user reads some other block, it is satisfied from page P. Over time, the remaining contents of page P are copied to page P', and all future requests are satisfied from P', which is the COW operation.

A page may become unwriteable because of a disk fault instead of a user-initiated snapshot. Indeed, this method allows handling of the extreme case where the entire drive becomes unwriteable. A drive may enter "read-only mode" under certain severe fault conditions, and such a drive normally is taken out of service. The ability to gracefully retire such a drive enhances reliability of the storage system.

Figure 1A:
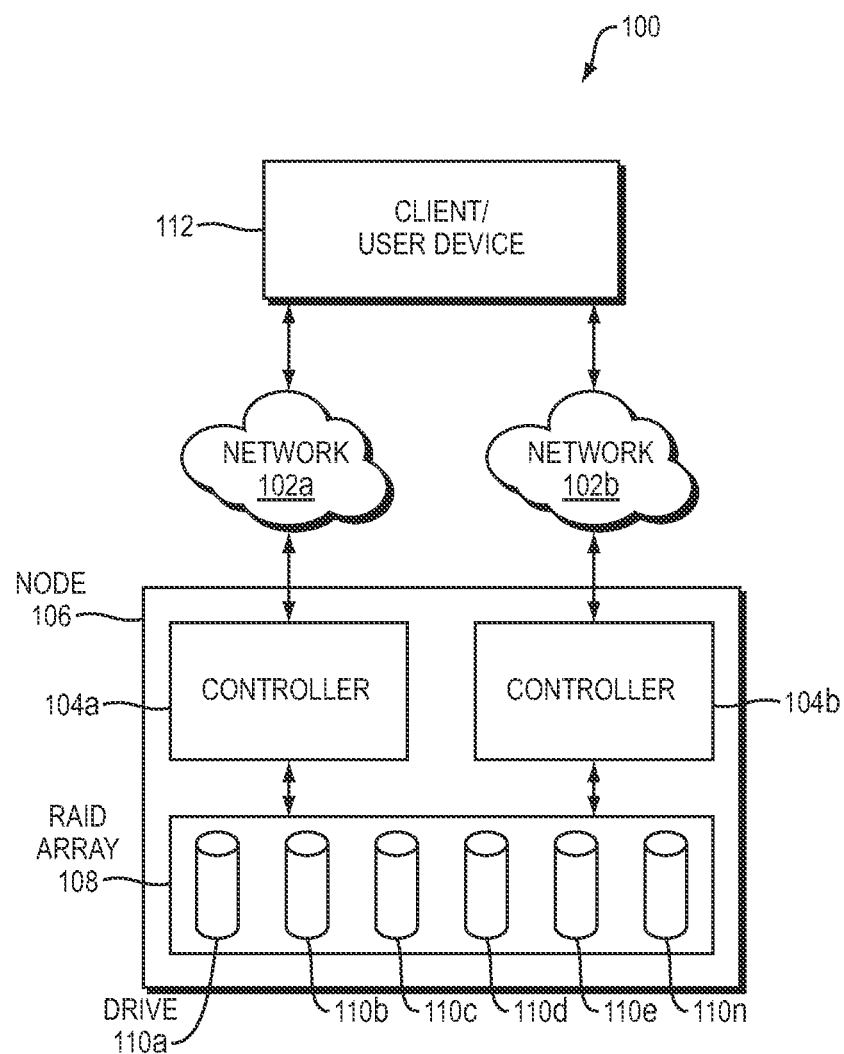
FIG. 1A is a block diagram illustrating an example embodiment of a node.

FIG. 1A is a block diagram 100 illustrating an example embodiment of a node 106. The node 106 includes at least one controller 104a-b and a RAID array 108. The RAID array 108 includes a plurality of drives 110a-n. The drives 110a-n can be configured in any manner allowed by the RAID array 108. The controllers 104a-b are each coupled to a respective network 102a-b. The networks 102a-b can be the same network or separate networks (e.g., an intranet and the Internet). A client/user device 112 can access volumes, formed of drives on the RAID array 108, presented by the node 106 by connecting to the respective network 102a-b.

The node 106, therefore, is configured to receive write requests over the networks 102a-b at the controllers 104a-b. The controllers 104a-b are then configured to write the data in the write requests to the RAID array 108. The data of the write requests is stored on at least one of the plurality of drives 110a-n. The RAID array 108 can have any number of drives 110a-n.

Figure 1B:
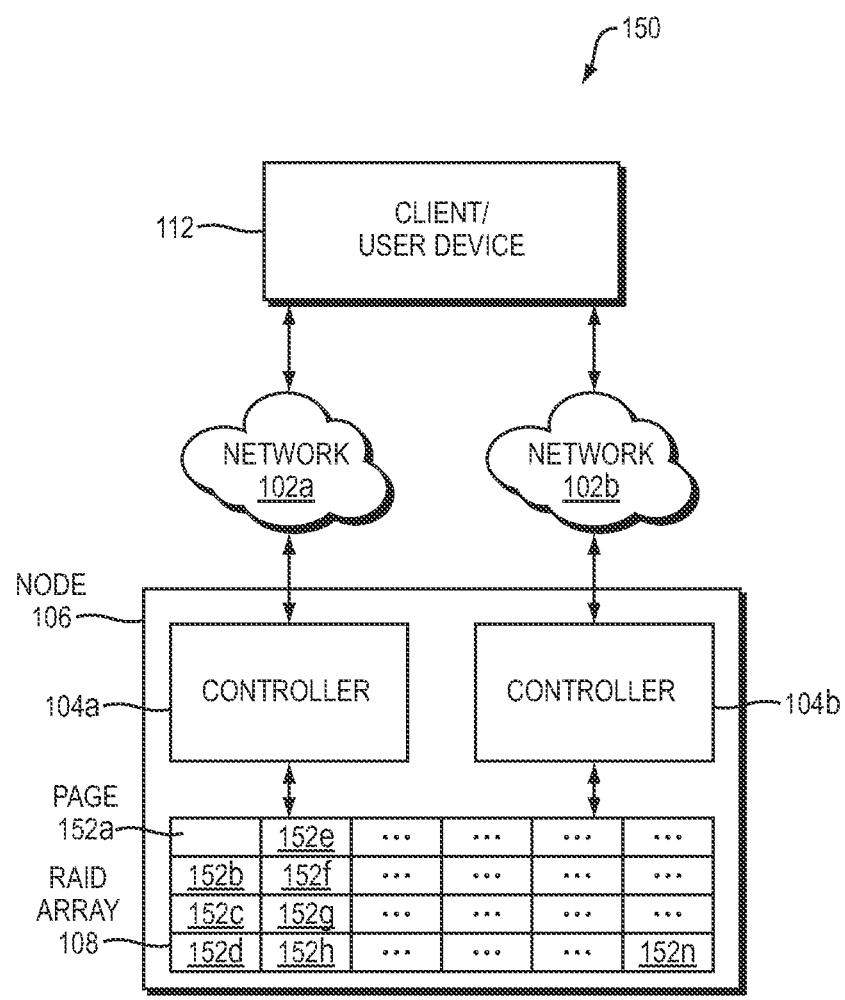
FIG. 1B is a block diagram illustrating another representation of the node.

FIG. 1B is a block diagram 150 illustrating another representation of the node 106. In this representation, the RAID array 108 includes a plurality of pages 152a-n. Each page 152a-n exists on one or more of the drives (not shown) illustrated in FIG. 1A. A client/user device 112 can access volumes, formed of the plurality of pages 152a-n, presented by the node 106 by connecting to the respective network 102a-b.

Figure 2:
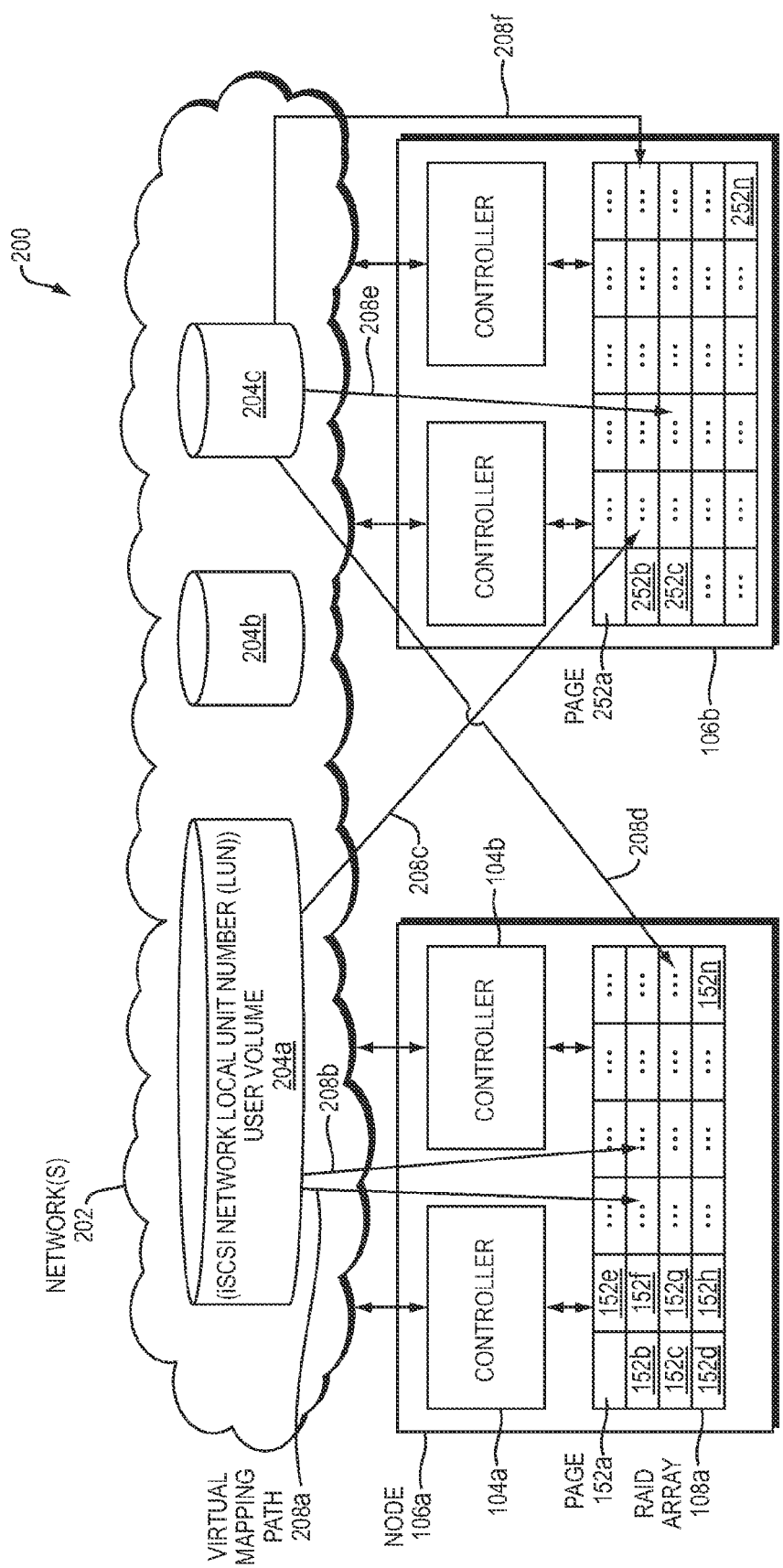
FIG. 2 is a block diagram illustrating two nodes coupled with network(s).

FIG. 2 is a block diagram 200 illustrating two nodes 106 coupled with network(s) 202. The nodes 106a-b are similar to the node 106 illustrated in FIG. 1B. The network(s) 202 facilitate connection by users to a plurality of user volumes 204a-c presented by the nodes 106a-b. The volumes 204a-c appear to users as unitary logical volumes, but are physically housed within a plurality of nodes 106a-b. The user volumes 104a-c can be iSCSI network logical unit number (LUN) units.

Each user volume 204a-c maps to pages 152a-n in the node 106a or pages 252a-n in node 106b. Each user volume 204a-c has a virtual mapping path 208a-f to one or more of the pages 152a-n and 252a-n. The user volumes 204a-c can map to any of the plurality of nodes 106a-b, or any combination of the plurality of nodes 106a-b. For example, user volume 204a maps to pages 152a-n in node 106a through virtual mapping paths 208a-b, and maps to pages 252a-n in node 106b through virtual mapping path 208c. Likewise, user volume 204c maps to pages 152a-n in nodes 106a through virtual mapping path 208d, and maps to pages 252a-n in node 106b through virtual mapping paths 208e-f. Any of the user volumes 204a-c can map to any combination of pages 152a-n and 252a-n in any combination of nodes 106a-b.

In one embodiment, at least one of the volumes 204a-c is presented when the user establishes the virtual mapping path 208a-f (e.g., a connection) to one of the nodes 106a-b. That node 106a-b becomes the owner of that connection. For example, virtual mapping path 208c can connect to node 106a before being forwarded to node 106b. The virtual mapping path 208c could connect to node 106b directly, without connecting through intervening node 106a, as shown in the diagram.

Figure 3:
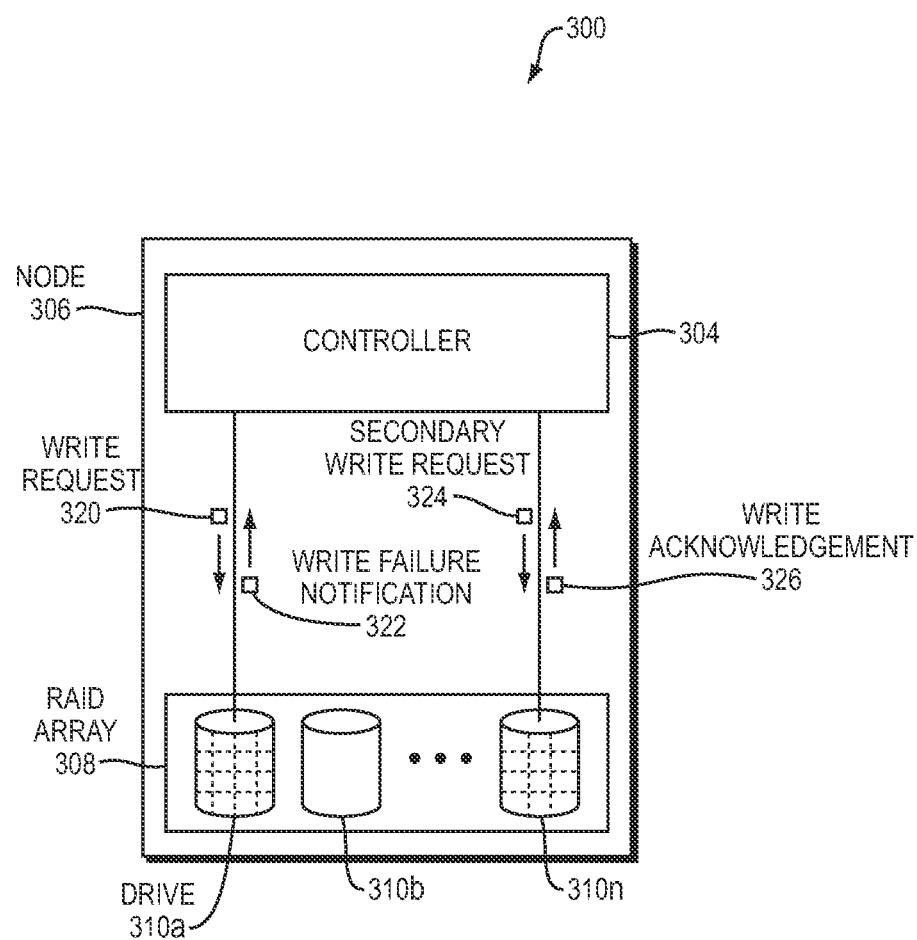
FIG. 3 is a block diagram illustrating an example embodiment of a node.

FIG. 3 is a block diagram 300 illustrating an example embodiment of a node 306. The node 306 includes a controller 304, a RAID array 308. The RAID array 308 includes drives 310a-n. The controller 304 issues a write request 320 to a drive 310a and the RAID array 308. Upon writing to a particular page within the drive 310a, the drive cannot execute the write request 320. Examples of reasons for failure can include drive failure, or physical damage to the drive 310a. Therefore drive issues a write failure notification 322 to the controller 304 in response to the failed write request 320. The controller 304 then determines it cannot write to the page in the drive 310a and issues a secondary write request 324 to another drive 310n in the RAID array 308. In this embodiment, the second drive 310n does not have a bad sector, successfully stores the data, and issues a write acknowledgement 326 to the controller 304.

In this manner, the node 306 avoids writing to a bad page or sector in the drive 310a, and writes the data to a good sector in drive 310n. This avoids issuing an error for the write in general, and allows the user to be agnostic of where the data is being stored. This also allows time to replace the faulty drive 310a in the node 306 by storing data intended for drive 310a in real time to a replacement drive (e.g., drive 301n), and over long-term, copying all data from the drive 310a to another drive 310b-n to eventually retire the faulty drive 310a.

Figure 4:
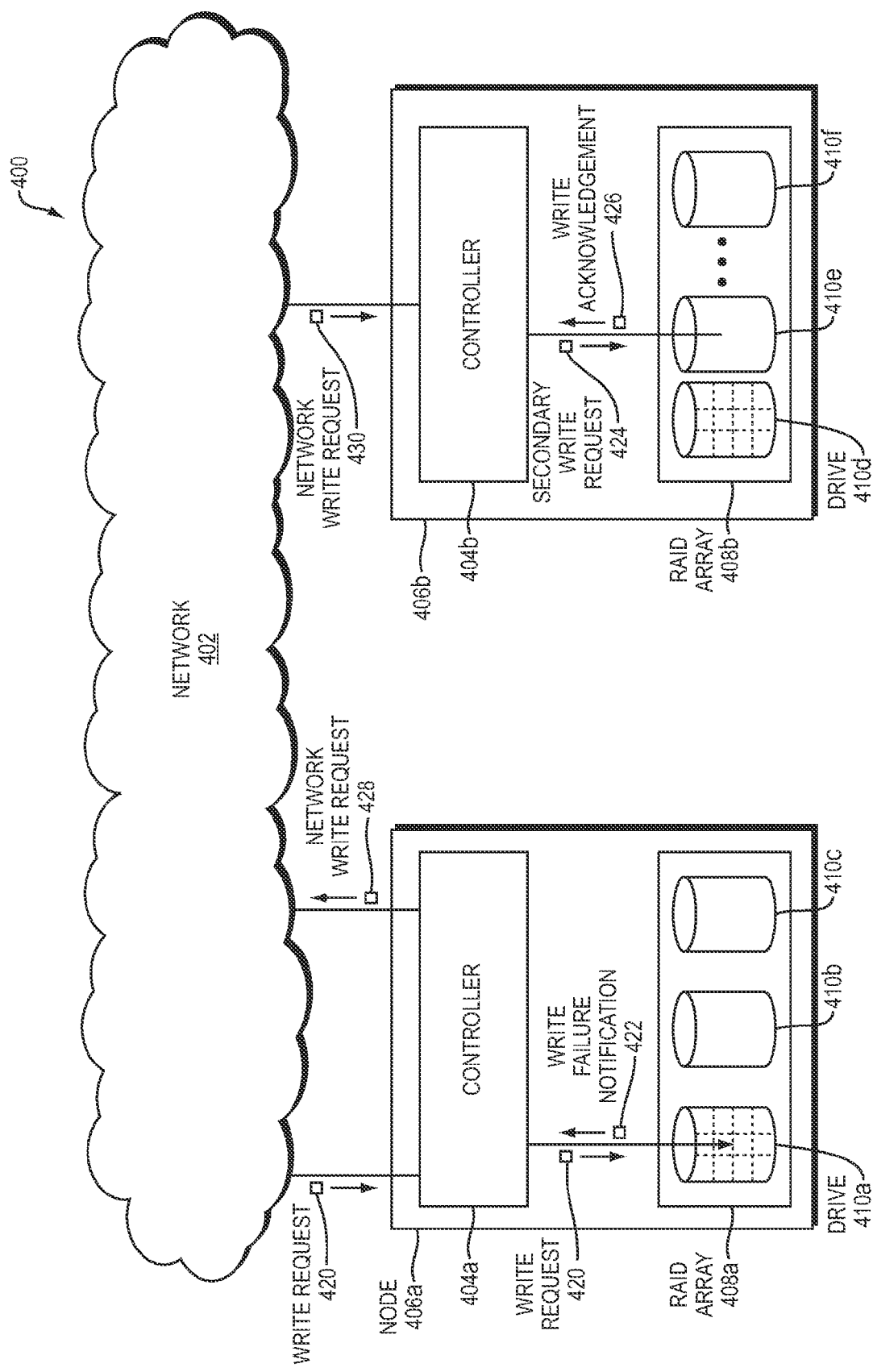
FIG. 4 is a block diagram illustrating example embodiments of a plurality of nodes coupled to a network.

FIG. 4 is a block diagram 400 illustrating example embodiments of a plurality of nodes 406a-b coupled to a network 402. The nodes 406a-b include respective controllers 404a-b and RAID arrays 408a-b, each of which includes respective drives 410a-f. Node 406a receives a write request 420 from the network 402 at its controller 404a. The controller 404a directs the write request 420 to a corresponding drive 410a. The drive 410a then issues a write failure notification 422 to the controller 404a after the write request 420 fails at the drive 410a. The controller 404a issues a network write request 428 to the network 402. The network 402 then forwards the network write request 430 to a second node 406b. The second node 406b receives the network write request 430 at the controller 404b. The controller 404b issues the secondary write request 424 to a drive in the RAID array 408b, in this instance drive 410e. Upon a successful write, the RAID array 408b issues a write acknowledgement 426 to the controller 404b. In this manner, the write request can be forwarded, either to a separate drive, or over a network 402 to a separate node 406b entirely.

Figure 5:
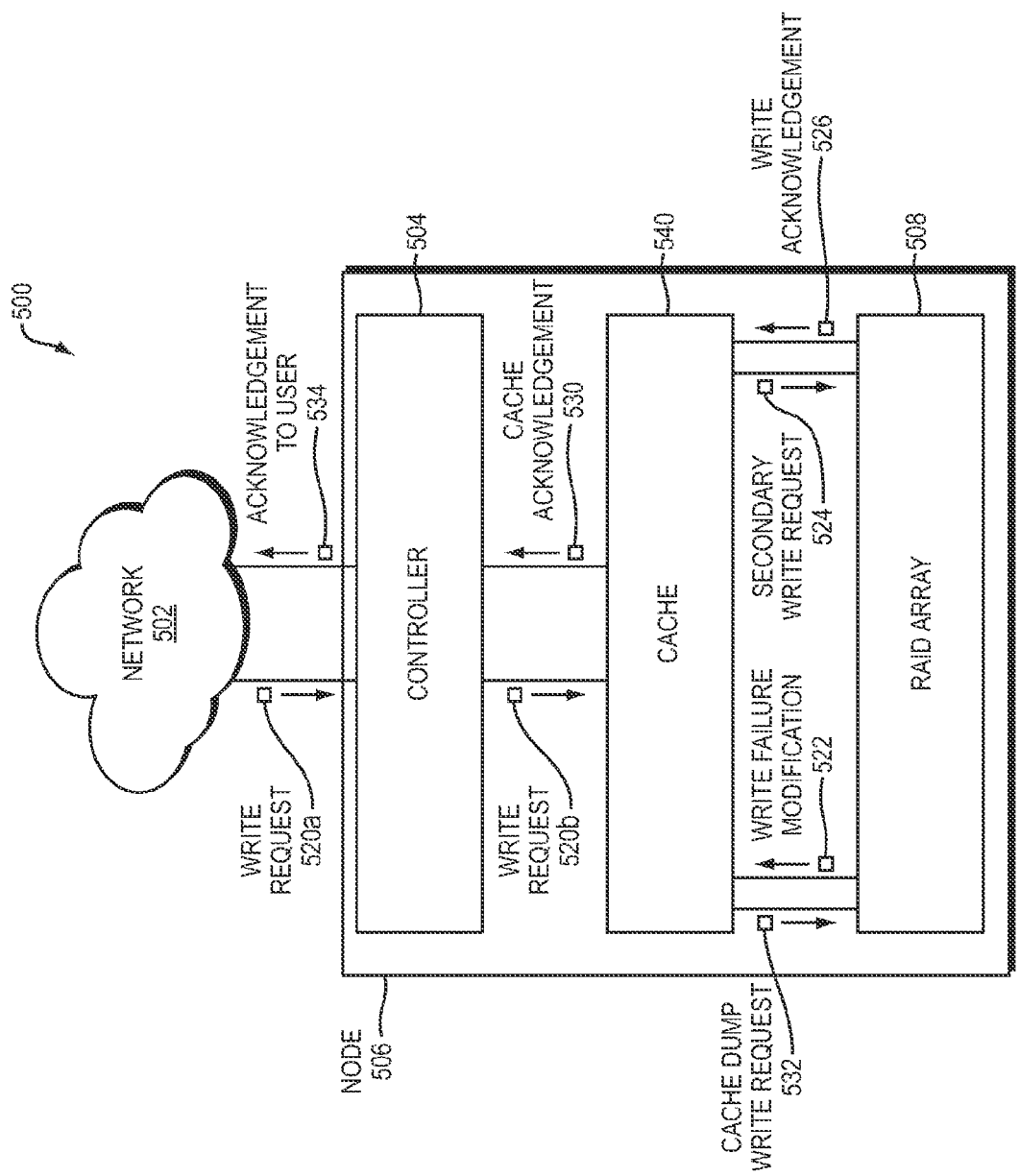
FIG. 5 is a block diagram illustrating example embodiments of a node configured to receive a write request from a network.

FIG. 5 is a block diagram 500 illustrating example embodiments of a node 506 configured to receive a write request 520a from a network 502. The node 506 receives the write request 520a at its controller 504. The controller 504 issues write request 520b to a cache 540. The cache stores the data of the write request 520b, and later writes the data to the RAID array 508 in a cache dump, for example with data from other write requests. Once the data from the write request 520b is stored in the cache, the cache issues a cache acknowledgement 530 to the controller 504. The controller 504 then issues an acknowledgement to user 534 through the network 502. In this way, the user over the network 502 assumes that the data of the write request 520a-b is successfully written and permanently stored in the node 506. This can present a problem when the cache dump, at a later time, does not successfully write to the RAID array 508. This is illustrated by the cache dump of write request 532 is issued by the cache 540 to the RAID array 508. Upon the write request failing, the RAID array 508 responds by issuing a write failure notification 522 to the cache 540. The cache 540 can then issue a secondary write request 524 to a different drive in the RAID array 508. After the secondary write request 524 is written successfully to a second drive, the RAID array 508 issues a write acknowledgement 526 to the cache 540.

The secondary write request, instead of being issued from the cache 540 to the RAID array 508, can be issued to the controller 504 and then forwarded to the network 502 to be issued to another node, where the write request is stored on a different hard drive in the second node. This is similar to the system illustrated in FIG. 4, however, the node 506 illustrates the cache 540.

Figure 6:
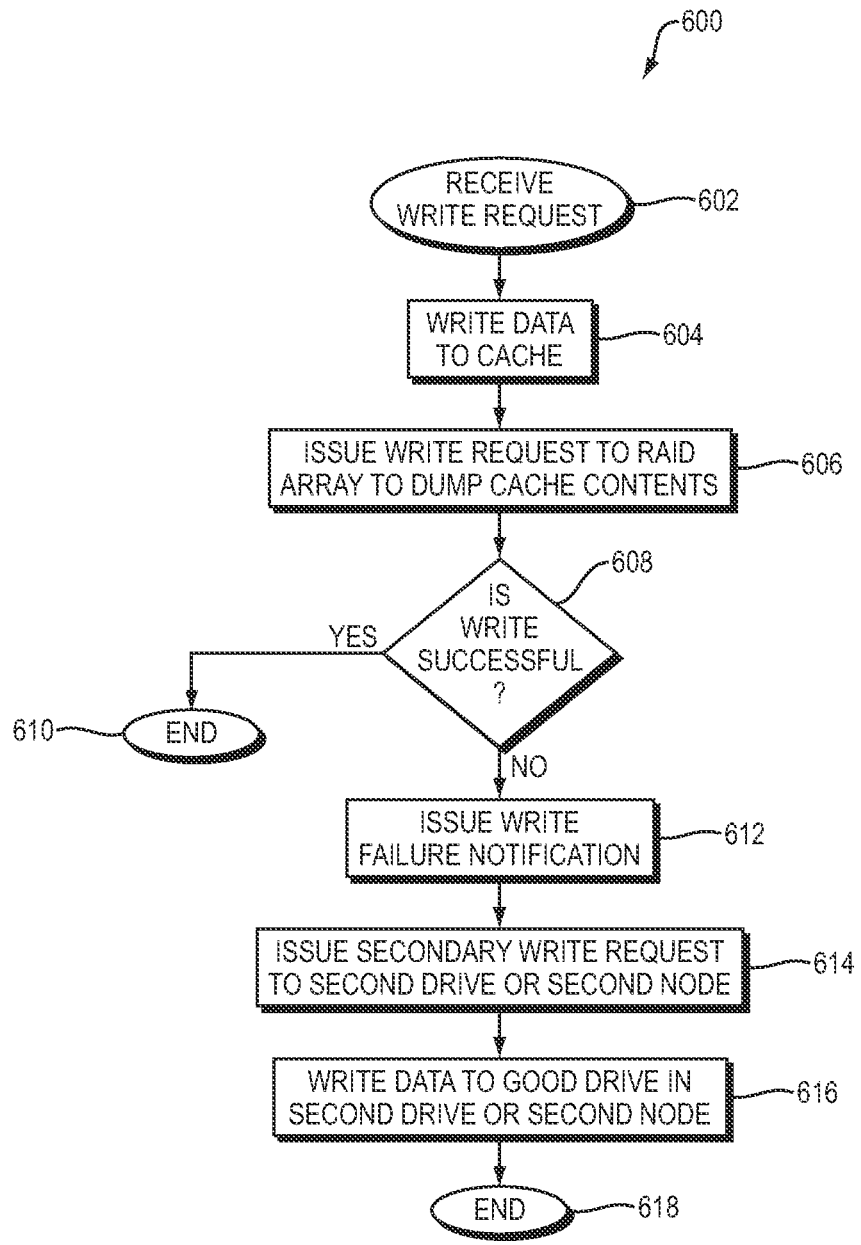
FIG. 6 is a flow diagram illustrating an example embodiment of a process employed by nodes in the present invention.

FIG. 6 is a flow diagram 600 illustrating an example embodiment of a process employed by nodes in the present invention. First, a node receives a write request (602). The node then writes data to a cache (604). Then, the node issues a write request to a RAID array to dump the cache contents to drives in the RAID array (606). Then, the node determines whether the write was successful (608). If the write was successful, the process ends (610). If the write was not successful, the node issues an internal write failure notification (612). Then, the node issues a secondary write request to either a second drive within the node, or a second drive within a second node (614). Then, the system writes data to a good drive, either being the second drive on the node or the second node (616). Then the process ends (618).

Figure 7:
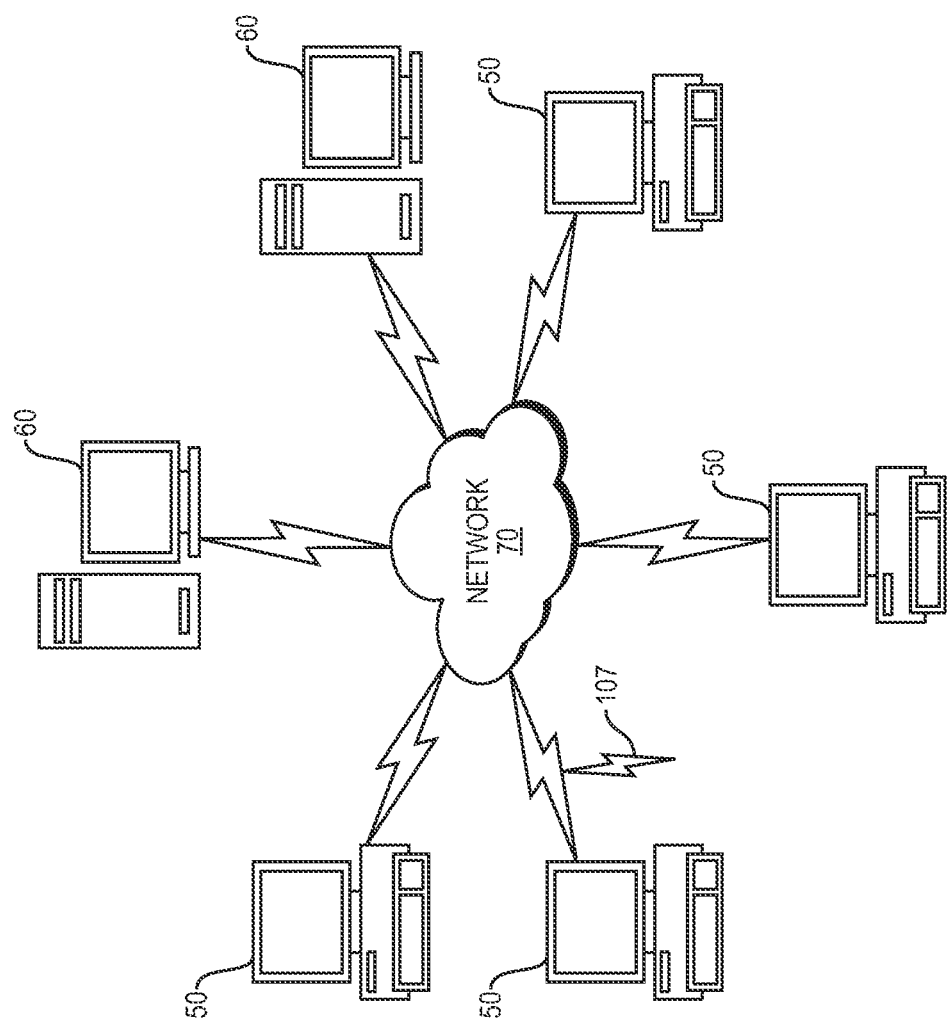
FIG. 7 illustrates a computer network or similar digital processing environment in which the present invention may be implemented.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
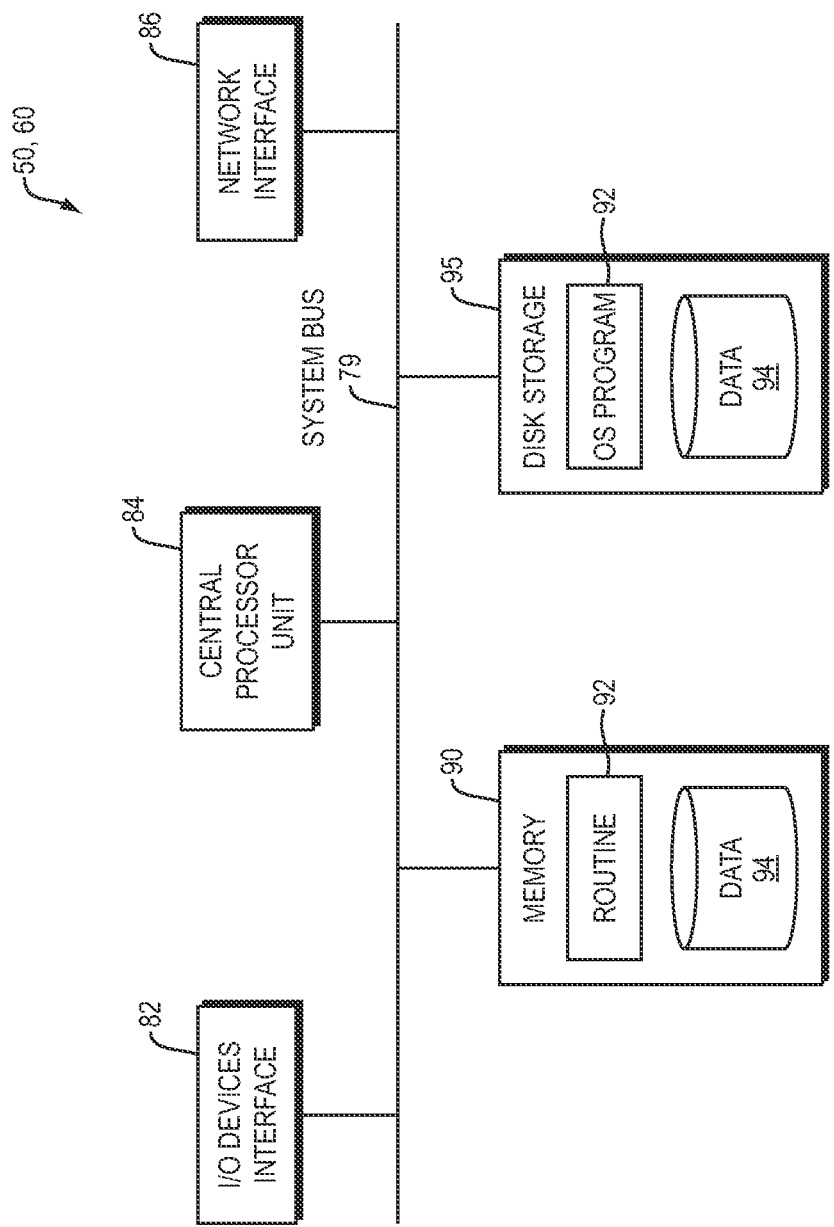
FIG. 8 is a diagram of the internal structure of a computer (e.g., client processor/device or server computers) in the computer system of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., surviving write error code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 (shown in FIG. 7) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
receiving a network write request at a node, the node having a controller and an array of drives, the network write request being directed towards a virtual volume;
at the controller of the node:
in response to the network write request, issuing a local write request to a first drive of the array of drives by mapping the virtual volume to a page of data of the first drive of the array of drives;
in response to a write failure notification caused by the write request of data to a first drive:
issuing a second local write request to a second drive of the array of drives that performs a copy-on-write, where the copy-on-write copies only the data from the write request to the second drive; and
copying data from the first drive of the array to the second drive of the array such that the first drive can be retired upon all data being from the first drive to the second drive.

2. The method of claim 1, wherein the second drive services data in a same way as the first drive.

3. The method of claim 1, wherein performing the copy-on-write includes copying a containing data unit including the write error.

4. The method of claim 1 further comprising:
receiving a write request at the first drive from a third drive;
storing the data from the write request in a cache;
reporting successful execution of the write request;
writing data from the write request to a drive in the first drive; and
receiving the write error from the drive.

5. The method of claim 4, wherein performing the copy-on-write uses the data stored in the cache.

6. A system comprising:
a node having a controller and an array of drives, the node configured to receive a network write request being directed towards a virtual volume;
wherein the controller of the node is further configured to:
in response to the network write request, issue a local write request to a first drive of the array of drives by mapping the virtual volume to a page of data of the first drive of the array of drives;
in response to a write failure notification caused by the write request of data to a first drive:

issue a second local write request to a second drive of the array of drives that performs a copy-on-write, where the copy-on-write copies only the data of the write request to the second drive, and copy data from the first drive to the second drive such that the first drive of the array can be retired upon all data being from the first drive to the second drive of the array.

7. The system of claim 6, wherein the second drive services data in a same way as the first drive.

8. The system of claim 6, wherein performing the non-transitory copy-on-write includes copying a containing data unit including the write error.

9. The system of claim 6 further comprising:
a request reception module configured to receive a write request at the first drive from a third drive;
a cache writing module configured to store the data from the write request in a cache;
a request reporting module configured to report successful execution of the write request;
a data writing module configured to write data from the write request to a drive in the first drive; and
an error reception module configured receive to the write error from the drive.

10. The system of claim 9, wherein performing the copy-on-write uses the data stored in the cache.

11. A non-transitory computer readable medium configured to store instructions to be executed by a processor, the instructions comprising:
receiving a network write request at a node, the node having a controller and an array of drives, the network write request being directed towards a virtual volume;
at the controller of the node:
in response to the network write request, issuing a local write request to a first drive of the array of drives by mapping the virtual volume to a page of data of the first drive of the array of drives;
in response to a write failure notification caused by the write request of data to a first drive:
issue a second local write request to a second drive of the array of drives that performs a copy-on-write, where the copy-on-write copies only the data of the write request to the second drive; and
copying data from the first drive to the second drive such that the first drive can be retired upon all data being from the first drive of the array to the second drive of the array.

12. The non-transitory computer readable medium of claim 11, wherein the second drive services data in a same way as the first drive.

13. The non-transitory computer readable medium of claim 11, wherein performing the copy-on-write includes copying a containing data unit including the write error.

14. The non-transitory computer readable medium of claim 11 wherein the processor is further configured to execute the instructions including:
receiving a write request at the first drive from a third drive;
storing the data from the write request in a cache;
reporting successful execution of the write request;
writing data from the write request to a drive in the first drive; and
receiving the write error from the drive.

15. The non-transitory computer readable medium of claim 14, wherein performing the copy-on-write uses the data stored in the cache.

* * * * *